April 20, 1948.   G. J. MULLER   2,440,182
PICKER
Filed Dec. 11, 1945

INVENTOR
George J. Muller
BY
Burton Harding
ATTORNEYS.

WITNESS:

Patented Apr. 20, 1948

2,440,182

UNITED STATES PATENT OFFICE 2,440,182

PICKER

George J. Muller, Philadelphia, Pa., assignor to Taylor Fibre Company, Norristown, Pa., a corporation of Pennsylvania Application December 11, 1945, Serial No. 634,161

5 Claims. (Cl. 139—159)

1

This invention relates to an improvement in pickers adapted to be mounted on the upper ends of picker sticks for looms.

The object of my invention is the provision of a picker which will absorb some of the shock received by the striking of the shuttle at the end of its travel across the lay of the loom, and thus reduce the shock transmitted to the end of the picker stick, and thus prolong the life of the stick.

Another object of my invention is the provision of means whereby the vibrations transmitted to the loom caused by the striking of the shuttle against the picker are reduced, which will not only eliminate the vibrations set up in the loom but will also reduce the vibrations transmitted to the floor of the mill, as well as greatly reduce the noise caused by the striking of the pickers by the shuttles.

The above objects are obtained by providing a shock absorber between the shuttle striking portion of the picker and the picker stick engaging portion.

Figure 1:
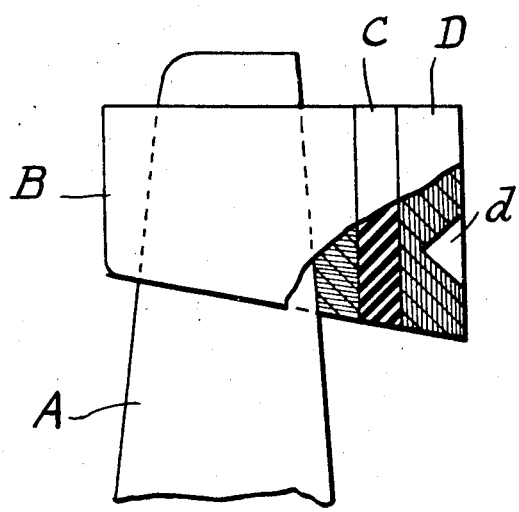
Figure 2:
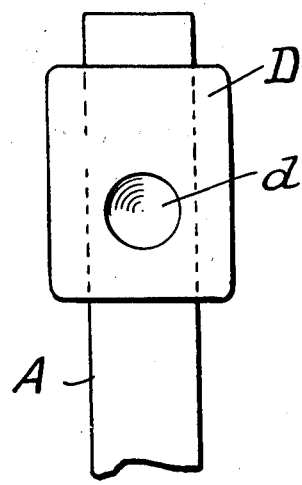

Having thus set forth the objects of my invention, I will proceed for illustrative purposes to a detailed description of the preferred embodiment thereof with reference to the accompanying drawings, in which:

Fig. 1 is a side view of a picker mounted on the end of a picker stick with a portion in section; and Fig. 2 is an end view thereof showing the shuttle striking face of the picker.

In the drawings, the reference character A designates one end of a picker stick on which is mounted a picker comprising three portions B, C, and D.

The portion B is formed of strips of fibrous material either paper or fabric impregnated with a binder such as formaldehyde resin or other thermosetting resin, molded to form a through slot for the picker stick.

The outer portion D which forms the shuttle striking member may also be formed of impregnated paper or fabric, and a thermosetting resin, or may be formed of a well-known vulcanized fibre, and is provided with a tapered recess d in its outer face for the reception of the pointed end of a loom shuttle.

Interposed between the members B and D is a block of rubber C or other resilient material capable of resisting the striking force of the shuttle and of sufficient vibration absorbing power.

The above described material formed from thermosetting cement and fibrous material, or vulcanized fibre, may hereinafter be termed hardened fibrous material, or the thermosetting cement and fibrous material may be termed phenol fibre.

After the members B, C and D are formed, they are secured to each other by means of hot set phenol formaldehyde adhesive, modified polyvinyl acetate adhesive, modified furfural resin adhesive or any other adhesive having sufficient bonding qualities for bonding the elements to each other. As the engaging faces of the rubber block are substantially the same area as the faces of the members B and D, the outer faces of the members B, C and D will be substantially flush with each other and all of the edges thereof will be exposed, whereby the only shock which is transmitted to the member B from the member D is entirely through the shock absorber C so that no shock is transmitted directly from the member D to the member B by connections between said members B and D around the member C, thus permitting each of the edges of the shock absorber free outward expansion under shuttle shock.

What I desire to secure by Letters Patent is:

1. A picker for a loom picker stick, comprising a member provided with a socket member for mounting on a picker stick, a shuttle engaging member and a shock absorbing member between said members bonded to the side faces thereof, the shock absorbing member forming the sole support between the socket member and the shuttle engaging member, permitting free lateral expansion in all directions of the shock absorbing member between the bonded faces of the members.

2. A picker for a loom picker stick, comprising a separately formed socket member for mounting on a picker stick, a separately formed shuttle engaging member and a separately formed shock absorbing member between said members, the engaging faces of the shock absorbing member being substantially the same area as the faces of the other members engaged thereby, the adjacent faces of three members being cemented to each other, whereby the shock absorbing member forms the sole support between the socket member and the shuttle engaging member permitting unrestricted lateral expansion in all directions of the shock absorbing member between the cemented faces of the members.

3. A picker for a loom picker stick, comprising a separately formed member formed of hardened fibrous material having a socket for the reception of the end of a picker stick, a separately formed hardened fibrous member for engagement with a shuttle, and a separately formed resilient shock absorbing member interposed between said members, the adjacent faces of the three members being cemented to each other, whereby the shuttle engaging member is wholly supported from the socket member by the shock absorbing member, permitting unrestricted lateral expansion in all directions of the shock absorbing member between the cemented faces of the members.

4. A picker having a member formed of thermosetting cement and fibrous material having a picker stick socket therein, a separately formed shuttle engaging member formed of thermosetting cement and fibrous material, and a separately formed rubber shock absorbing member interposed between said members and cemented thereto, whereby the shuttle engaging member is wholly supported from the socket member by the shock absorbing member, permitting unrestricted lateral expansion in all directions of the shock absorbing member between the cemented faces of the members.

5. A picker having a member formed of thermosetting cement and fibrous material having a picker stick socket therein, a separately formed shuttle engaging member formed of vulcanized fibre, and a separately formed rubber shock absorbing member interposed between said members and cemented thereto, whereby the shuttle engaging member is wholly supported from the socket member by the shock absorbing member, permitting unrestricted lateral expansion in all directions of the shock absorbing member between the cemented faces of the members.

GEORGE J. MULLER.

REFERENCES CITED

The following references are of record in the file of this patent:

UNITED STATES PATENTS

| Number | Name | Date |
| --- | --- | --- |
| 1,442,388 | Emmons | Jan. 16, 1923 |
| 2,104,832 | Dodenhoff | Jan. 11, 1938 |
| 2,161,662 | Bacon | June 6, 1939 |
| 2,267,013 | Brahs | Dec. 23, 1941 |
| 2,341,904 | Clark | Feb. 15, 1944 |

FOREIGN PATENTS

| Number | Country | Date |
| --- | --- | --- |
| 19,728 | Great Britain | 1892 |
| 352,522 | Great Britain | July 13, 1931 |